US012695926B2

(12) United States Patent
Fei et al.

(10) Patent No.: US 12,695,926 B2
(45) Date of Patent: Jul. 28, 2026

(54) DATA STREAM-BASED PLAYING METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Wei Fei, Shenzhen (CN); Huacheng Chen, Shenzhen (CN); Hongzhan Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1 day.

(21) Appl. No.: 18/886,508

(22) Filed: Sep. 16, 2024

(65) Prior Publication Data

US 2025/0008170 A1 Jan. 2, 2025

Related U.S. Application Data

(63) Continuation of application No. PCT/CN2023/133501, filed on Nov. 23, 2023.

(30) Foreign Application Priority Data

Nov. 29, 2022 (CN) .......................... 202211510455.9

(51) Int. Cl.
*H04N 21/2343* (2011.01)
*H04L 69/22* (2022.01)

(52) U.S. Cl.
CPC ......... *H04N 21/2343* (2013.01); *H04L 69/22* (2013.01)

(58) Field of Classification Search
CPC ......... H04N 21/2343; H04N 21/44016; H04N 21/4402; H04N 21/2662; H04N 21/437;
(Continued)

(56) References Cited

U.S. PATENT DOCUMENTS 8,214,511 B2 * 7/2012 Jung ....................... H04L 69/16
709/227
8,914,534 B2 * 12/2014 Braness ............. H04N 21/8456
709/231
(Continued)

FOREIGN PATENT DOCUMENTS

CN 101656869 A 2/2010
CN 101729825 A 6/2010
(Continued)

OTHER PUBLICATIONS

The World Intellectual Property Organization (WIPO) International Search Report for PCT/CN2023/133501 Feb. 4, 2024 5 Pages (including translation).
(Continued)

*Primary Examiner* — Adil Ocak
(74) *Attorney, Agent, or Firm* — Anova Law Group, PLLC

(57) ABSTRACT

A data stream-based playing method includes: obtaining a packet header of a to-be-played second data stream in response to that a first player instance plays a first data stream, the packet header including at least one of a coding format or a data format of the second data stream; initializing a second player instance based on the coding format and the data format in the packet header, and playing the second data stream based on an initialized second player instance in response to switching from the first data stream to the second data stream.

20 Claims, 6 Drawing Sheets

(58) Field of Classification Search
CPC .... H04N 21/458; H04N 21/63; H04N 21/637;
H04N 21/6547; H04N 21/6581; H04N
21/8451; H04N 21/4516; H04L 69/22
USPC ........................................................ 725/116
See application file for complete search history.

(56) References Cited

U.S. PATENT DOCUMENTS

| | | | | |
|---|---|---|---|---|
| 9,071,887 | B2 * | 6/2015 | Yao .................... | H04N 21/2387 |
| 2003/0131076 | A1 * | 7/2003 | Nelson ..................... | H04N 7/52 |
| | | | | 709/219 |
| 2010/0191858 | A1 * | 7/2010 | Thomas ................ | H04L 65/611 |
| | | | | 709/231 |
| 2012/0246301 | A1 | 9/2012 | Vyrros et al. | |

FOREIGN PATENT DOCUMENTS

| | | | |
|---|---|---|---|
| CN | 105430489 | A | 3/2016 |
| CN | 110300338 | A | 10/2019 |
| JP | 2002063780 | A | 2/2002 |

OTHER PUBLICATIONS

The European Patent Office (EPO) The Extended European Search Report for Application No. 23896640.2 Sep. 22, 2025 9 Pages.

* cited by examiner

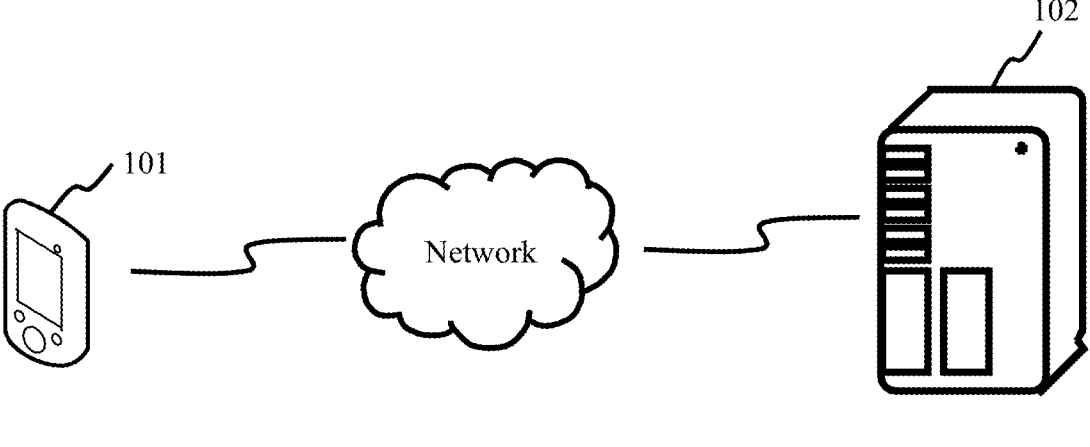

FIG. 1

When a first player instance plays a first data stream, a terminal obtains a packet header of a to-be-played second data stream, the packet header including a coding format and a data format of the second data stream          201

The terminal initializes a second player instance based on the coding format and/or the data format in the packet header          202

The terminal plays the second data stream based on an initialized second player instance in response to a played data stream being switched from the first data stream to the second data stream          203

FIG. 2

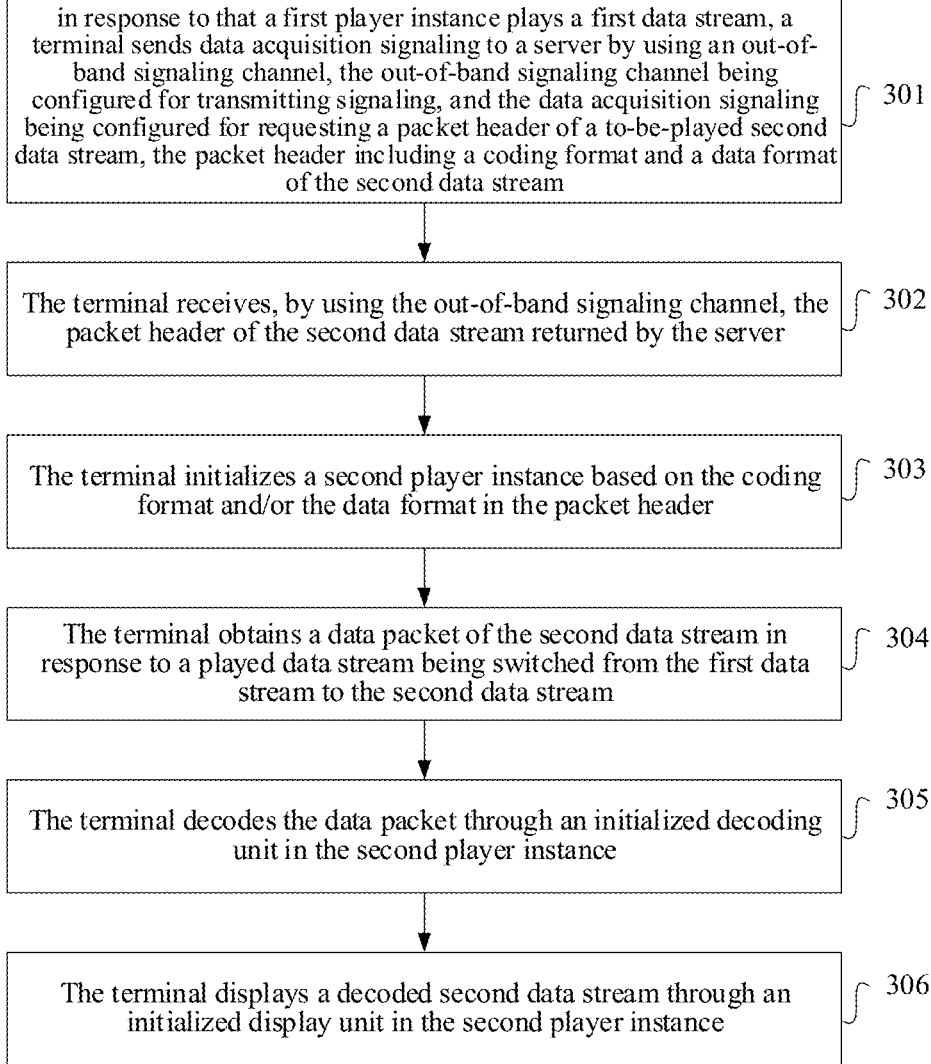

in response to that a first player instance plays a first data stream, a terminal sends data acquisition signaling to a server by using an out-of-band signaling channel, the out-of-band signaling channel being configured for transmitting signaling, and the data acquisition signaling being configured for requesting a packet header of a to-be-played second data stream, the packet header including a coding format and a data format of the second data stream — 301

The terminal receives, by using the out-of-band signaling channel, the packet header of the second data stream returned by the server — 302

The terminal initializes a second player instance based on the coding format and/or the data format in the packet header — 303

The terminal obtains a data packet of the second data stream in response to a played data stream being switched from the first data stream to the second data stream — 304

The terminal decodes the data packet through an initialized decoding unit in the second player instance — 305

The terminal displays a decoded second data stream through an initialized display unit in the second player instance — 306

FIG. 3

DATA STREAM-BASED PLAYING METHOD AND APPARATUS, DEVICE, AND MEDIUM

CROSS-REFERENCES TO RELATED APPLICATIONS

This application is a continuation application of PCT Patent Application No. PCT/CN2023/133501, filed on Nov. 23, 2023, which claims priority to Chinese Patent Application No. 202211510455.9, filed with the China National Intellectual Property Administration on Nov. 29, 2022 and titled "DATA STREAM-BASED PLAYING METHOD AND APPARATUS, DEVICE, MEDIUM, AND PROGRAM PRODUCT", the entire contents of both of which are incorporated herein by reference.

FIELD OF THE TECHNOLOGY

The present disclosure relates to the field of computer technologies, and in particular, to data stream-based playing.

BACKGROUND OF THE DISCLOSURE

With the development of computer technologies, online media resources such as live streaming videos and live streaming audio are increasingly rich. An increasing number of people become accustomed to watching media resources through mobile phones. How to play the media resources is a research focus in the art.

For example, the media resource is a live streaming video. When a user starts to watch the live streaming video, a mobile phone needs to first obtain a data stream corresponding to a first frame of video in the live streaming video from a server, obtain a packet header from the data stream, initialize a player instance in the mobile phone based on the packet header, then obtain a data packet in which a data stream of the live streaming video is encapsulated, decode the data packet, and play the decoded data stream.

SUMMARY

Embodiments of the present disclosure provide a data stream-based playing method and apparatus, a device, a medium, and a program product. There is no need to initialize a player instance in a process of playing a data stream, so that time consumed for starting to play the data stream is greatly reduced, and playing efficiency of the data stream is improved. Technical solutions are as follows.

According to an aspect, a data stream-based playing method is provided, the method including: obtaining a packet header of a to-be-played second data stream when a first player instance plays a first data stream, the packet header including at least one of a coding format or a data format of the second data stream; initializing a second player instance based on at least one of the coding format or the data format in the packet header; and playing the second data stream by using an initialized second player instance in response to a played data stream being switched from the first data stream to the second data stream.

According to another aspect, a data stream-based playing apparatus is provided, the apparatus including: an obtaining module, configured to obtain a packet header of a to-be-played second data stream when a first player instance plays a first data stream, the packet header including at least one of a coding format or a data format of the second data stream; an initialization module, configured to initialize a second player instance based on at least one of the coding format or the data format in the packet header; and a playing module, configured to play the second data stream by using an initialized second player instance in response to a played data stream being switched from the first data stream to the second data stream.

According to another aspect, a computer device is provided, including a processor and a memory, the memory being configured to store at least one segment of computer program, the at least one segment of program being loaded and executed by the processor to implement the data stream-based playing method according to the embodiments of the present disclosure.

According to another aspect, a non-transitory computer-readable storage medium is provided, having at least one segment of computer program stored therein, the at least one segment of computer program being loaded and executed by a processor to implement the data stream-based playing method according to the embodiments of the present disclosure.

Embodiments of the present disclosure provide a data stream-based playing method. When a first player instance plays a first data stream, a packet header of a to-be-played second data stream is obtained, and a second player instance is initialized based on a coding format and a data format of the data stream in the packet header, so that resources required for playing the second data stream can be allocated to the to-be-played second data stream in advance. Objectives of determining the next to-be-played second data stream and preloading the second data stream are achieved in a process of playing the first data stream. When the first data stream is switched to the second data stream, an initialized second player instance can directly play the to-be-played second data stream, and there is no need to initialize the second player instance when the second data stream starts to be played, so that time consumed for starting to play the second data stream is greatly reduced, and playing efficiency of the data stream is improved.

BRIEF DESCRIPTION OF THE DRAWINGS

FIG. 1 is a schematic diagram of an implementation environment of a data stream-based playing method according to an embodiment of the present disclosure.

FIG. 2 is a flowchart of a data stream-based playing method according to an embodiment of the present disclosure.

FIG. 3 is a flowchart of another data stream-based playing method according to an embodiment of the present disclosure.

DESCRIPTION OF EMBODIMENTS

Figure 4:
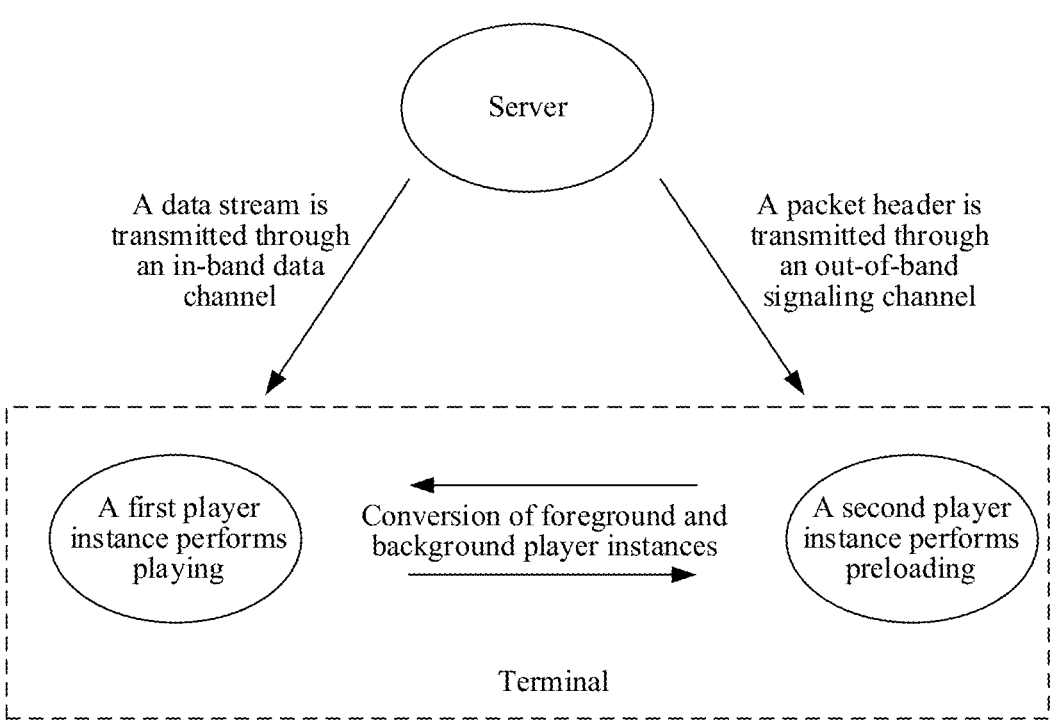
FIG. 4 is a framework diagram of playing a data stream according to an embodiment of the present disclosure.

To make objectives, technical solutions, and advantages of the present disclosure clearer, implementations of the present disclosure are further described below in detail with reference to the accompanying drawings.

The terms "first", "second", and the like in the present disclosure are configured for distinguishing between same items or similar items whose effects and functions are basically the same. The "first", "second", and "n$^{th}$" do not have a dependency relationship in logic or time sequence, and a quantity and an execution order thereof are not limited.

In the present disclosure, the term "at least one" means one or more, and "a plurality of" means two or more.

The information (including, but not limited to, user equipment information, user personal information, and the like), data (including, but not limited to, data for analysis, stored data, displayed data, and the like), and signals involved in the present disclosure are all authorized by a user or fully authorized by each party, and the collection, use, and processing of relevant data need to comply with relevant laws, regulations, and standards of relevant countries and regions. For example, the data stream involved in the present disclosure is obtained with full authorization.

For ease of understanding, terms involved in the present disclosure are explained below.

Web Real-Time Communication (WebRTC): It refers to introducing real-time communication in a web browser, including voice and video calls. The WebRTC implements a web page-based voice conversation or video call, to implement a real-time communication capability of a web without a plug-in. In this embodiment of the present disclosure, a WebRTC technology is used for communication between a terminal and a server.

Round-Trip Time (RTT): It refers to a total delay experienced from a moment at which a transmitting end sends data to a moment at which the transmitting end receives an acknowledgment from a receive end (where the receive end sends the acknowledgment immediately after receiving the data). It is an important performance indicator in a computer network.

Session Description Protocol (SDP): It refers to a protocol supported in transmission of a data stream. It describes an initialization parameter of a data stream.

Instance: In object-oriented programming, a "class" is referred to as an "instance" after instantiation. A "class" is static and does not occupy process memory, while an "instance" has dynamic memory. In this embodiment of the present disclosure, a data stream is used as an object, and a terminal can create a player instance corresponding to the data stream through a player of a client. A process is an "executing program" having its own address space. The client in this embodiment of the present disclosure is equivalent to a process. The process may include a plurality of instances. For any instance, the instance may include a plurality of threads. The player instance in the present disclosure is used as an example. The player instance includes a pulling unit, a decoding unit, and a display unit. For any unit, the unit belongs to a thread in the player instance.

A data stream-based playing method provided in the embodiments of the present disclosure can be performed by a computer device. In some embodiments, the computer device is a terminal. An implementation environment of the data stream-based playing method provided in the embodiments of the present disclosure is described below by using an example in which the computer device is a terminal. FIG. 1 is a schematic diagram of an implementation environment of a data stream-based playing method according to an embodiment of the present disclosure. Referring to FIG. 1, the implementation environment includes a terminal 101 and a server 102. The terminal 101 and the server 102 can be directly or indirectly connected in a wired or wireless communication manner. This is not limited in the present disclosure.

In some embodiments, the terminal 101 is a smartphone, a tablet computer, a notebook computer, a desktop computer, a smart speaker, a smartwatch, a smart voice interaction device, a smart household appliance, and a vehicle-mounted terminal, but is not limited thereto. An application capable of playing a data stream is installed on the terminal 101. The application may be a live streaming application, or may be a video application. This is not limited in this embodiment of the present disclosure. The data stream may be a data stream of a live streaming video, a data stream of live streaming audio, a data stream of an online video, or the like. This is not limited in this embodiment of the present disclosure. For example, the terminal 101 is a terminal used by a user. The user uses the terminal 101 to play the data stream. In a process of playing the data stream, the terminal 101 can obtain a data packet of the data stream from the server 102, decode the data packet, and play a decoded data stream.

A person skilled in the art may learn that there may be more or fewer terminals. For example, there may be only one terminal, or there may be dozens of or hundreds of terminals or more. A quantity of terminals and a device type of the terminal are not limited in this embodiment of the present disclosure. The terminal 110 may generally refer to one of a plurality of terminals. In this embodiment, the terminal 110 is merely used as an example for description.

In some embodiments, the server 102 is an independent physical server, or can be a server cluster or a distributed system formed by a plurality of physical servers, or can be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The server 102 is configured to provide a background service for the application that plays the data stream. In some embodiments, the server 102 is responsible for primary computing work and the terminal 101 is responsible for secondary computing work; or the server 102 is responsible for secondary computing work and the terminal 101 is responsible for primary computing work; or a distributed computing architecture is adopted for the server 102 and the terminal 101 to perform collaborative computing.

FIG. 2 is a flowchart of a data stream-based playing method according to an embodiment of the present disclosure. Referring to FIG. 2, in this embodiment of the present disclosure, an example in which the method is performed by a terminal is used for description. The data stream-based playing method includes the following operations.

201: When a first player instance plays a first data stream, a terminal obtains a packet header of a to-be-played second data stream, the packet header including a coding format and a data format of the second data stream.

In this embodiment of the present disclosure, the first data stream is a data stream currently played by the terminal. The second data stream is a next to-be-played data stream associated with the first data stream. For any data stream, the data stream may be a data stream of a live streaming video, a data stream of live streaming audio, a data stream of an online video, or a data stream of online audio. This is not limited in this embodiment of the present disclosure. A player client is installed on the terminal. The terminal creates a player instance through the player client. The player instance is configured to play a corresponding data stream. In this embodiment of the present disclosure, the first player instance refers to a player instance currently running in the foreground in the player client. The currently displayed data stream is played by the first player instance. When the terminal plays the first data stream through the first player instance, the terminal can obtain the packet header of the next to-be-played second data stream. For example, the second data stream is a data stream of a live streaming video. The packet header includes a video coding format and a video data format of the live streaming video. The video data format may be configured for representing a size of each frame of video in the live streaming video. This is not limited in this embodiment of the present disclosure. For example, the second data stream is a data stream of live streaming audio. The packet header includes an audio coding format and an audio data format of the live streaming audio. The audio data format may be configured for representing a sampling rate and soundtrack data of the live streaming audio. This is not limited in this embodiment of the present disclosure.

The playing of the first data stream by the first player instance may include a period during which the first player instance plays the first data stream, or may include a moment at which the first player instance starts to play the first data stream. This is not limited in the present disclosure.

In some embodiments, the terminal obtains the packet header of the second data stream through an out-of-band signaling channel. In some embodiments, the terminal may send data acquisition signaling to a server through the out-of-band signaling channel, to request the server to return the packet header of the second data stream. For details, refer to operation 301 to operation 302. In some embodiments, the server may alternatively directly send the packet header of the second data stream to the terminal through the out-of-band signaling channel without the need of signaling sent by the terminal. Therefore, the terminal can obtain the packet header of the second data stream without the need of sending the signaling to the server. A manner in which the terminal obtains the packet header is not limited in this embodiment of the present disclosure.

In this embodiment of the present disclosure, the terminal usually obtains, from the server through an in-band data channel, a data stream for playing. However, in order not to affect transmission efficiency of the data stream, the terminal obtains a packet header from the server through the out-of-band signaling channel that is not configured for transmitting the data stream (for example, the first data stream or the second data stream).

Because the packet header is transmitted through the out-of-band signaling channel rather than being transmitted through the in-band data channel for transmitting the data stream, the transmission of the packet header does not affect the transmission of the currently played first data stream, which helps improve a playing effect of the data stream.

202: The terminal initializes a second player instance based on the coding format and/or the data format in the packet header.

In this embodiment of the present disclosure, the second player instance refers to a player instance running in the background in this embodiment of the present disclosure. The player instance running in the background is configured to preload the to-be-played data stream. The terminal obtains the coding format and/or the data format from the packet header. Then, the terminal initializes the second player instance based on the coding format and/or the data format, to achieve an objective of allocating, to the to-be-played data stream in advance, a resource required for playing the second data stream.

An objective of initializing the second player instance is to enable the second player instance to complete initialization processing, for example, obtaining an internal memory required for running, and setting a parameter required for playing, before the second player instance is invoked to implement a function of playing the data stream. An initialized second player instance can directly play the second data stream when being invoked.

The packet header includes the coding format and the data format of the second data stream. The coding format is configured for identifying a manner in which the second data stream is coded, and may be, for example, an audio coding format or a video coding format. This is not limited in this embodiment of the present disclosure. The data format is configured for identifying a data format of the second data stream, and may be, for example, a format of audio data or a format of video data. This is not limited in this embodiment of the present disclosure.

For example, if the second data stream is a data stream of a video in an H264 format, the packet header of the second data stream may include information such as a sequence parameter set (SPS) and a picture parameter set (PPS). If the second data stream is a data stream of a video in an H265 format, the packet header of the second data stream may include information such as a video parameter set (VPS), an SPS, and a PPS. If the second data stream is a data stream of audio in an advanced audio coding (AAC) format, the packet header of the second data stream may include information such as an audio specific configuration (ASC).

When the second player instance is initialized, the coding format may function as a guide for setting a parameter related to coding in the second player instance, and the data format may function as a guide for setting a parameter related to understanding and displaying a data stream in the second player instance.

203: The terminal plays the second data stream based on the initialized second player instance in response to the played data stream being switched from the first data stream to the second data stream.

In this embodiment of the present disclosure, in response to that the played data stream is switched from the first data stream to the second data stream, the terminal obtains the second data stream from a storage address of the second data stream. Then, the terminal directly plays the obtained second data stream based on the initialized second player instance, does not need to initialize the second player instance for the second data stream when the second data stream starts to be played.

This embodiment of the present disclosure provides a data stream-based playing method. When the first player instance plays the first data stream, the packet header of the to-be-played second data stream is obtained, and the second player instance is initialized based on the coding format and the data format of the data stream in the packet header, so that the resource required for playing the second data stream can be allocated to the to-be-played second data stream in advance. Objectives of determining the next to-be-played second data stream and preloading the second data stream are achieved in a process of playing the first data stream. In this way, when the first data stream is switched to the second data stream, the to-be-played second data stream is directly played through the player instance, there is no need to initialize the second player instance when the second data stream starts to be played, so that time consumed for starting to play the second data stream is greatly reduced, and playing efficiency of the data stream is improved.

FIG. 3 is a flowchart of another data stream-based playing method according to an embodiment of the present disclosure. Referring to FIG. 3, in this embodiment of the present disclosure, an example in which the method is performed by a terminal is used for description. The data stream-based playing method includes the following operations.

301: In response to that a first player instance plays a first data stream, the terminal sends data acquisition signaling to a server by using an out-of-band signaling channel, the out-of-band signaling channel being configured for transmitting signaling, and the data acquisition signaling being configured for requesting a packet header of a to-be-played second data stream, the packet header including a coding format and a data format of the second data stream.

In this embodiment of the present disclosure, the terminal includes the first player instance and a second player instance. The first player instance is a player instance currently running in the foreground in a player client, and is configured to play the first data stream currently displayed by the terminal. The second player instance is a player instance currently running in the background, and is configured to preload the next to-be-played second data stream. In response to that the terminal plays the first data stream through the first player instance, the terminal determines the to-be-played second data stream. The terminal generates the data acquisition signaling based on a data identifier of the second data stream. Then, the terminal sends obtaining signaling to the server through the out-of-band signaling channel, so that the server provides the packet header of the second data stream to the terminal.

A process in which the terminal determines the second data stream based on the first data stream is: The terminal determines the to-be-played second data stream based on the first data stream and a play order. The play order may be determined based on a recommendation algorithm of a specific data stream, or may be customized by a user. This is not limited in this embodiment of the present disclosure.

In some embodiments, the play order is determined based on a recommendation algorithm of a data stream. The recommendation algorithm may be recommending a specific data type of a data stream that a target object is interested in. Correspondingly, the terminal obtains a historical play record of the target object. The historical play record includes a plurality of data streams played in a historical stage. Then, the terminal determines, based on the historical play record, the data type of the data stream that the target object is interested in. Then, the terminal determines the play order based on the data type. For any data type, in the historical play record, the more data streams corresponding to the data type, the higher order of the data streams corresponding to the data type in the play order. According to the solution provided in this embodiment of the present disclosure, according to the specific data type that the target object is interested in, a data stream of a corresponding type is recommended to the target object, so that the played data stream is more in line with an intention of the user. A to-be-played data stream can also be preloaded based on the play order. When the data stream starts to be played, the data stream can be directly played, which improves playing efficiency of the data stream. All of these can improve a playing effect.

In some embodiments, the play order is determined based on a recommendation algorithm of the data stream. The recommendation algorithm may be recommending a popular data stream. Correspondingly, the terminal determines a play order of a plurality of data streams based on an amount of interaction of the plurality of data streams. The amount of interaction is positively correlated with a play order. A larger amount of interaction of a data stream indicates a higher play order of the data stream. A smaller amount of interaction of a data stream indicates a lower play order of the data stream. The amount of interaction may be a number of likes, a number of forwards, a number of comments, or the like. This is not limited in this embodiment of the present disclosure. According to the solution provided in this embodiment of the present disclosure, the popular data stream is recommended to the target object based on the amount of interaction of the plurality of data streams, and subsequently, a to-be-played data stream is preloaded based on the play order. When the data stream starts to be played, the data stream can be directly played, which improves playing efficiency of the data stream. All of these can improve a playing effect of the data stream.

302: The terminal receives, by using the out-of-band signaling channel, the packet header of the second data stream returned by the server.

In this embodiment of the present disclosure, after the terminal sends the data acquisition signaling to the server, the server can obtain the packet header of the to-be-played second data stream based on the data identifier in the data acquisition signaling. Then, the server sends the packet header to the terminal. The server can obtain the packet header from the second data stream stored in a local database; or the server may obtain the packet header from the second data stream stored in another server. This is not limited in this embodiment of the present disclosure.

In some embodiments, when the server does not store the second data stream, the server can obtain the packet header of the second data stream from a server configured to store the second data stream, so that the packet header of the second data stream can be returned to the terminal. Correspondingly, when the server does not store the second data stream, the terminal receives, based on the out-of-band signaling channel, a first data acquisition response returned by the server. Then, in response to that the server obtains the packet header of the second data stream, the packet header returned by the server is received based on the out-of-band signaling channel. The first data acquisition response indicates that the out-of-band signaling channel supports signaling interaction between the terminal and the server. According to the solution provided in this embodiment of the present disclosure, in response to that the server does not store the second data stream, the first data acquisition response can be returned to the terminal first, to notify the terminal that the out-of-band signaling channel is smooth and supports the signaling interaction between the two parties, thereby establishing a session between the terminal and the server, to prevent the terminal from disconnecting the out-of-band signaling channel due to failure to receive a response for a long time. In addition, in response to that the server obtains the second data stream from another server, the packet header of the second data stream returned by the server is received based on the out-of-band signaling channel, which not only implements an asynchronous retrieval (returning the second data stream) manner, but also pulls the second data stream to the server associated with the terminal before the second data stream is played, so that when the second data stream starts to be played, the server can directly perform pushing to the terminal, and there is no need for the terminal to send signaling to request the second data stream. Therefore, in this solution, retrieval time consumed for the server to pull the second data stream from another server can also be eliminated from time consumed for starting to play a first frame, so that the time consumed for starting to play the first frame is shorter than that of the related art. In addition, because the packet header is transmitted through the out-of-band signaling channel rather than being transmitted through an in-band data channel for transmitting a data stream, the transmission of the packet header does not affect the transmission of the currently played first data stream, which helps improve a playing effect of the data stream.

When the server stores the second data stream, the server can directly obtain the packet header from the stored second data stream, and return the packet header to the terminal. Correspondingly, in response to that the server stores the second data stream, the terminal receives, by using the out-of-band signaling channel, a second data acquisition response returned by the server. The second data acquisition response carries the packet header, and the second data acquisition response is configured for indicating that the out-of-band signaling channel supports the signaling interaction between the terminal and the server. According to the solution provided in this embodiment of the present disclosure, in response to that the server stores the second data stream, the packet header of the second data stream can be added to the second data acquisition response, so that the packet header of the second data stream is sent to the terminal while the second data acquisition response is returned to the terminal. In this way, not only the terminal is notified in time that the out-of-band signaling channel is smooth, and the signaling interaction between the two parties is supported, but also the packet header of the second data stream can be sent to the terminal faster, thereby improving efficiency of the terminal in obtaining the packet header. In addition, since the packet header is transmitted through the out-of-band signaling channel rather than being transmitted through the in-band data channel for transmitting a data stream, the transmission of the packet header does not affect the transmission of the currently played first data stream, which helps improve the playing effect of the data stream.

303: The terminal initializes a second player instance based on the coding format and/or the data format in the packet header.

In this embodiment of the present disclosure, the terminal obtains the coding format and/or the data format of the second data stream based on the packet header of the second data stream. Then, the terminal initializes the second player instance based on the coding format and/or the data format. That is, the terminal allocates, based on the coding format and the data format of the second data stream, a resource required for playing the second data stream by a subsequent second player instance in advance. The resource may be a decoding resource, a display resource, an internal memory resource, or the like required for decoding and playing the second data stream. This is not limited in this embodiment of the present disclosure. The decoding resource may be software and hardware to be invoked when a data packet of the second data stream is decoded. The display resource may be software and hardware to be invoked for displaying a decoded second data stream. The internal memory resource includes an internal memory space occupied for decoding the data packet of the second data stream, an internal memory space occupied for displaying the second data stream, and an internal memory space for storing the second data stream. This process may be referred to as initializing the second player instance.

In some embodiments, the second player instance includes functional units such as a decoding unit and a display unit. The terminal can set a parameter for the functional unit in the second player instance, so that the functional unit can invoke software and hardware required for playing the second data stream and play the second data stream based on a format of the second data stream.

For the decoding unit, the terminal can set a parameter for the decoding unit, so that the decoding unit can invoke software and hardware required for decoding the data packet of the second data stream, and the software and hardware can perform decoding based on the coding format and the data format of the second data stream. This process may be referred to as initializing the decoding unit. In this process, the decoding resource required for decoding the second data stream is allocated to the second player instance.

For example, the second data stream is a data stream of a video in an H264 format. The packet header of the second data stream includes information such as an SPS and a PPS. The terminal can set the parameter for the decoding unit in the second player instance based on the information such as the SPS and the PPS in the packet header, so that the decoding unit can invoke software and hardware required for decoding the video. In addition, the parameter can further indicate the invoked software and hardware to perform decoding based on a decoding manner corresponding to the video in the H264 format, and decode each frame in the video into a video of a corresponding size.

For the display unit, the terminal can set a parameter for the display unit, so that the display unit can invoke software and hardware required for displaying the decoded second data stream, and the software and hardware can perform displaying based on the data format of the second data stream. This process may be referred to as initializing the display unit. In this process, the display resource required for displaying the second data stream is allocated to the second player instance.

For example, the second data stream is a data stream of a video in an H264 format. The packet header of the second data stream includes information such as an SPS and a PPS. The terminal can set the parameter for the display unit in the second player instance based on information such as an SPS and a PPS in the packet header, so that the display unit can invoke software and hardware required for displaying a video. In addition, the parameter can further indicate the invoked software and hardware to perform displaying based on a size of the video indicated in the packet header.

A process in which the terminal decodes and displays the second data stream through the second player instance needs to occupy the internal memory resource. Before playing the second data stream, the terminal can allocate, to the second data stream in advance based on the coding format and the video format in the packet header of the second data stream, an internal memory resource required for playing. That is, after setting the parameter of the functional unit in the second player instance, the terminal can allocate, in advance, the internal memory resource occupied when the functional unit performs a corresponding function, thereby improving playing efficiency of the second data stream.

Correspondingly, operation 303 includes the following process: The terminal sets the parameter of the functional unit in the second player instance based on the coding format and the data format in the packet header. The functional unit is configured to decode and display the second data stream. Then, the terminal allocates, to the second player instance based on the parameter of the functional unit in the second player instance, the internal memory resource required for playing the second data stream. According to the solution provided in this embodiment of the present disclosure, before the data stream is played, the functional unit in the player instance is initialized based on the coding format and the data format of the data stream in the packet header, so that the resource required for playing the second data stream can be allocated to the to-be-played data stream in advance. When the to-be-played data stream is played, the to-be-played data stream can be directly decoded by an initialized functional unit, and there is no need to initialize the decoding resource for the data stream when the data stream starts to be played, so that time consumed for starting to play the data stream is greatly reduced, and playing efficiency of the data stream is improved.

Since a moment at which the terminal obtains the packet header of the second data stream to a moment at which the second data stream is played are uncertain, the terminal and the server can periodically perform interaction to ensure normal communication between the terminal and the server. That is, between operation 303 and operation 304, the terminal and the server can periodically perform interaction. Correspondingly, the terminal sends, at a preset time interval, heartbeat signaling to the server by using the out-of-band signaling channel. Then, the terminal device receives a heartbeat response returned by the server. The out-of-band signaling channel is configured for transmitting signaling; the heartbeat signaling is configured for notifying the server of a current status of the terminal; and the heartbeat response is configured for indicating that a communication connection between the terminal and the server still exists. Duration of the preset time interval is not limited in this embodiment of the present disclosure. According to the solution provided in this embodiment of the present disclosure, the heartbeat signaling is sent to the server in a process from obtaining the packet header to playing the second data stream, to notify the server of the current status. In addition, the heartbeat response returned by the server is received, to ensure normal communication between the terminal and the server, providing a guarantee for subsequent interaction between the terminal and the server.

The foregoing operation 301 to operation 303 may be considered as a stage of preloading the second data stream. In this stage, the terminal obtains the packet header of the second data stream through the signaling interaction with the server, and then creates a playing instance of the second data stream in the second player instance based on the coding format and the data format in the packet header, to implement preloading of the second data stream.

304: The terminal obtains the data packet of the second data stream in response to the played data stream being switched from the first data stream to the second data stream.

In this embodiment of the present disclosure, in response to that the data stream currently played by the terminal is switched from the first data stream to the second data stream, the terminal can obtain the data packet of the second data stream from the server. The data packet is a second data stream encapsulated based on a specific coding format. The data packet of the second data stream is transmitted based on the in-band data channel between the terminal and the server. Correspondingly, the terminal obtains the data packet of the second data stream through the in-band data channel. In some embodiments, the terminal may send a request to the server through the in-band data channel, to request the server to return the data packet of the second data stream. In some embodiments, the server may alternatively directly send the data packet of the second data stream to the terminal through the in-band data channel, so that the terminal obtains the data packet of the second data stream. Therefore, the terminal does not need to send the request to the server, and the server can directly push the stream to the terminal, so that the terminal obtains the data packet of the second data stream. A manner in which the terminal obtains the data packet is not limited in this embodiment of the present disclosure.

In some embodiments, the terminal may send the request to the server through the in-band data channel, to request the server to return the data packet of the second data stream. Correspondingly, in response to switching from the first data stream to the second data stream, the terminal sends a connection establishment request to the server by using the in-band data channel. Then, the terminal receives, from the in-band data channel, an establishment response returned by the server. Then, the terminal obtains the data packet of the second data stream from the in-band data channel. The in-band data channel is configured for transmitting the second data stream. The connection establishment request is configured for requesting to establish a data transmission connection to the server. The establishment response is configured for indicating that the in-band data channel supports data transmission between the terminal and the server. When the terminal successfully receives the establishment response, it indicates that a data transmission channel between the terminal and the server is successfully established. That is, the in-band data channel supports the data transmission between the terminal and the server. According to the solution provided in this embodiment of the present disclosure, the second data stream is transmitted through the in-band data channel between the terminal and the server. Because the in-band data channel and the out-of-band signaling channel are two independent channels, the transmission of the second data stream is not affected by signaling transmission in the out-of-band signaling channel, so that a data stream switching process is smoother, which helps improve a switching effect and a playing effect.

For example, FIG. 4 is a framework diagram of playing a data stream according to an embodiment of the present disclosure. Referring to FIG. 4, the first player instance in the terminal serves as a foreground player instance, and obtains, from the server based on the in-band data channel, the first data stream for playing. The second player instance in the terminal serves as a background player instance, and obtains, based on the out-of-band signaling channel, the packet header of the second data stream from the server. The first player instance is converted to the second player instance in response to switching from the first data stream to the second data stream. That is, the second player instance in the terminal serves as the foreground player instance, and obtains, from the server based on the in-band data channel, the second data stream for playing. The first player instance in the terminal serves as the background player instance, and obtains a packet header of a third data stream from the server based on the out-of-band signaling channel. The third data stream is a next to-be-played data stream adjacent to the second data stream.

305: The terminal decodes the data packet through an initialized decoding unit in the second player instance.

In this embodiment of the present disclosure, in the process of initializing the second player instance in operation 303, the terminal initializes the decoding unit in the second player instance. Then, the terminal decodes, through the initialized decoding unit, the data packet of the second data stream in a decoding manner corresponding to the coding format of the second data stream. A data format of the decoded second data stream complies with the data format indicated in the packet header. According to the solution provided in this embodiment of the present disclosure, before the data stream is played, the decoding unit in the player instance is initialized based on the coding format and the data format of the data stream in the packet header, so that the resource can be allocated to the to-be-played data stream in advance. When the to-be-played data stream is played, the to-be-played data stream can be directly decoded by the initialized decoding unit, and there is no need to initialize the decoding unit for the data stream when the data stream starts to be played, so that the time consumed for starting to play the data stream is greatly reduced, and playing efficiency of the data stream is improved.

306: The terminal displays the decoded second data stream through an initialized display unit in the second player instance.

In this embodiment of the present disclosure, in the process of initializing the second player instance in operation 303, the terminal initializes the display unit in the second player instance. Then, the terminal displays the decoded second data stream based on the data format of the second data stream through the initialized display unit. In this embodiment of the present disclosure, the time consumed for the terminal to start to play the first frame of the second data stream includes only time for establishing a connection between the terminal and the server, time for transmitting the first frame of the second data stream, and time for decoding the first frame of the second data stream, and does not include time for initializing the player instance, time for the signaling interaction between the terminal and the server, and retrieval time consumed for the server to pull the second data stream from the server configured to store the second data stream. This can significantly improve the playing efficiency of the data stream.

Figure 5:
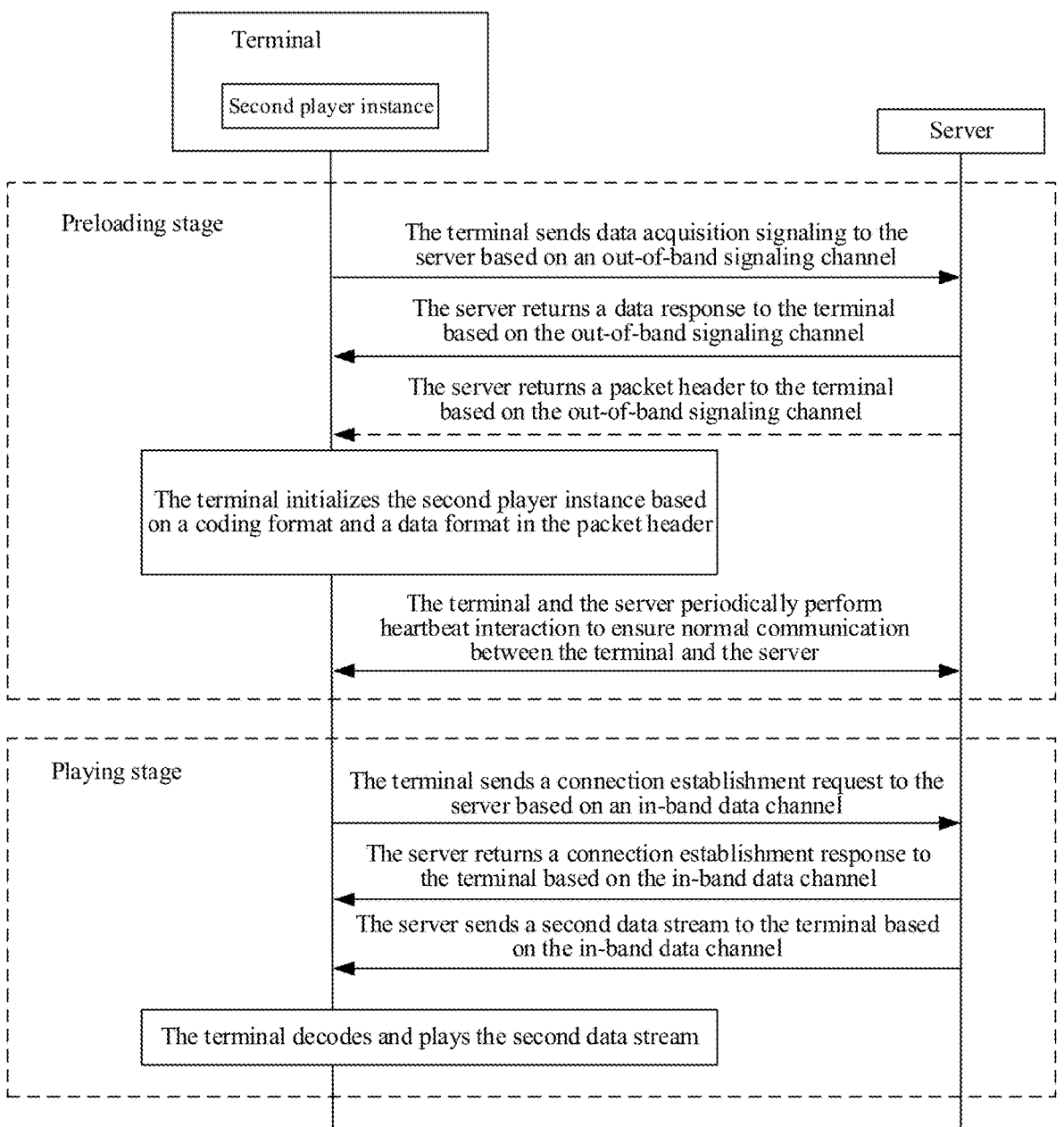
FIG. 5 is an interaction flowchart of a data stream-based playing method according to an embodiment of the present disclosure.

To describe this solution more clearly, the data stream-based playing method provided in the present disclosure is described again below with reference to the accompanying drawings. FIG. 5 is an interaction flowchart of a data stream-based playing method according to an embodiment of the present disclosure. Referring to FIG. 5, in response to that the first data stream is played, the second player instance (WebRTC Client) of the terminal sends the data acquisition signaling (Offer) to the server (WebRTC Server). Then, in response to that the server does not store the second data stream, the server first returns, to the terminal, a data response (Answer) that does not carry the packet header. Then, the server obtains the second data stream from another server, and returns the packet header of the second data stream to the terminal. In response to that the server stores the second data stream, the server first returns, to the terminal, a data response carrying the packet header. That is, an operation in which the server sends the packet header to the terminal may or may not exist, which is represented by a dashed line. Then, the terminal initializes the second player instance based on the coding format and the data format in the packet header. Then, since the moment at which the terminal obtains the packet header of the second data stream to the moment at which the second data stream is played are uncertain, heartbeat interaction can be periodically performed between the terminal and the server, to ensure normal communication between the terminal and the server. Then, in response to that the first data stream is switched to the second data stream, the terminal sends the connection establishment request (Stun Request) to the server based on the in-band data channel. Then, the server returns a connection establishment response (Stun Response) to the terminal based on the in-band data channel. When the terminal successfully receives the establishment response, it indicates that data transmission can be performed on the in-band data channel between the terminal and the server. Then, the server pulls the stream based on the in-band data channel, that is, sends the second data stream to the terminal. Then, the terminal decodes and plays the second data stream.

Embodiments of the present disclosure provide the data stream-based playing method. When the first player instance plays the first data stream, the packet header of the to-be-played second data stream is obtained, and the second player instance is initialized based on the coding format and the data format of the data stream in the packet header, so that the resource required for playing the second data stream can be allocated to the to-be-played second data stream in advance. Objectives of determining the next to-be-played second data stream and preloading the second data stream are achieved in a process of playing the first data stream, so that the second data stream can be directly decoded by the initialized decoding unit in the second player instance, and the decoded second data stream can be directly played by the initialized display unit in the second player instance. There is no need to allocate the resource to the second data stream when the second data stream starts to be played, so that the time consumed for starting to play the second data stream is greatly reduced, and the playing efficiency of the data stream is improved. In addition, because a size of the packet header is much smaller than a size of the second data stream, before the second data stream is played, the second data stream is preloaded by obtaining the packet header, which does not require more download bandwidth, saves a traffic resource of the terminal, and reduces costs.

In this embodiment of the present disclosure, the terminal may alternatively initialize the second player instance before playing the first data stream. Then, the terminal preloads the second data stream based on the initialized second player instance. That is, before playing the first data stream, the terminal can obtain the data packet of the second data stream and store the data packet of the second data stream. When the second data stream starts to be played, the terminal can decode and display the stored second data stream based on the initialized second player instance. That is, a process in which the terminal initializes the player instance and obtains the data stream may occur on any occasion before playing the data stream. The foregoing embodiments mainly describe a case in which the terminal plays the to-be-played second data stream based on the initialized player instance when the first data stream is switched to the second data stream.

In this embodiment of the present disclosure, the terminal can further obtain a packet header of the first data stream based on the out-of-band signaling channel before playing the first data stream. Then, the terminal initializes the first player instance based on the packet header of the first data stream. Then, the terminal preloads the first data stream based on an initialized first player instance. That is, in response to a playing operation on the first data stream, the terminal obtains the data packet of the first data stream based on the in-band data channel, and decodes and displays the data packet of the first data stream through the initialized first player instance.

Figure 6:
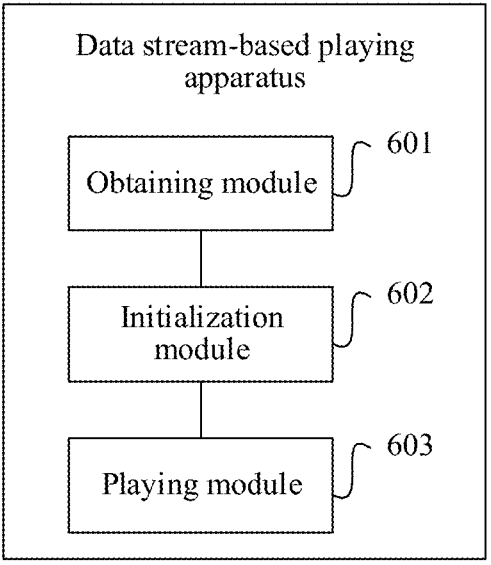
FIG. 6 is a block diagram of a data stream-based playing apparatus according to an embodiment of the present disclosure.

FIG. 6 is a block diagram of a data stream-based playing apparatus according to an embodiment of the present disclosure. The apparatus is configured to perform the operations for performing the foregoing data stream-based playing method. Referring to FIG. 6, the data stream-based playing apparatus includes: an obtaining module 601, an initialization module 602, and a playing module 603.

The obtaining module 601 is configured to obtain a packet header of a to-be-played second data stream when a first player instance plays a first data stream, the packet header including a coding format and/or a data format of the second data stream.

The initialization module 602 is configured to initialize a second player instance based on the coding format and/or the data format in the packet header.

The playing module 603 is configured to play the second data stream by using an initialized second player instance in response to a played data stream being switched from the first data stream to the second data stream.

This embodiment of the present disclosure provides the data stream-based playing apparatus. When the first player instance plays the first data stream, the packet header of the to-be-played second data stream is obtained, and the second player instance is initialized based on the coding format and the data format of the data stream in the packet header, so that a resource required for playing the second data stream can be allocated to the to-be-played second data stream in advance. Objectives of determining the next to-be-played second data stream and preloading the second data stream are achieved in a process of playing the first data stream. In this way, when the first data stream is switched to the second data stream, the initialized second player instance directly plays the to-be-played second data stream, and there is no need to initialize the second player instance when the second data stream starts to be played, so that time consumed for starting to play the second data stream is greatly reduced, and playing efficiency of the data stream is improved.

Figure 7:
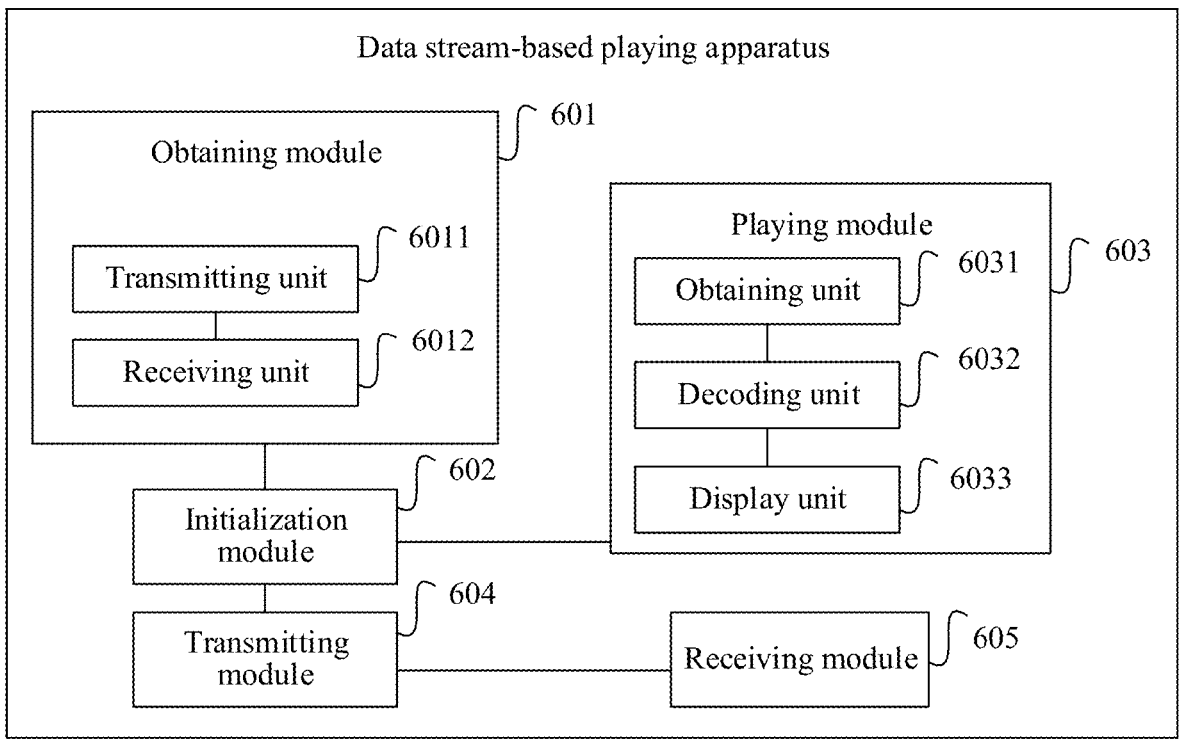
FIG. 7 is a block diagram of another data stream-based playing apparatus according to an embodiment of the present disclosure.

In some embodiments, FIG. 7 is a block diagram of another data stream-based playing apparatus according to an embodiment of the present disclosure. Referring to FIG. 7, an obtaining module 601 includes:

a transmitting unit 6011, configured to transmit data acquisition signaling to a server by using an out-of-band signaling channel, the out-of-band signaling channel being configured for transmitting signaling and not for transmitting a first data stream or a second data stream, and the data acquisition signaling being configured for requesting a packet header of the to-be-played second data stream; and a receiving unit 6012, configured to receive, by using the out-of-band signaling channel, the packet header returned by the server.

In some embodiments, still referring to FIG. 7, the receiving unit 6012 is configured to: in response to that the server does not store the second data stream, receive, by using the out-of-band signaling channel, a first data acquisition response returned by the server, the first data acquisition response indicating that the out-of-band signaling channel supports signaling interaction between a terminal and the server; and in response to that the server obtains the packet header of the second data stream, receive, by using the out-of-band signaling channel, the packet header returned by the server.

In some embodiments, still referring to FIG. 7, the receiving unit 6012 is further configured to: in response to that the server stores the second data stream, receive, by using the out-of-band signaling channel, a second data acquisition response returned by the server, the second data acquisition response carrying the packet header, and the second data acquisition response indicating that the out-of-band signaling channel supports the signaling interaction between the terminal and the server.

In some embodiments, still referring to FIG. 7, an initialization module 602 is configured to: set a parameter of a functional unit in a second player instance based on a coding format and a data format in the packet header, the functional unit being configured to decode and display the second data stream; and allocate, to the second player instance based on the parameter of the functional unit in the second player instance, an internal memory resource required for playing the second data stream.

In some embodiments, still referring to FIG. 7, a playing module 603 includes:

an obtaining unit 6031, configured to obtain a data packet of the second data stream in response to a played data stream being switched from the first data stream to the second data stream;

a decoding unit 6032, configured to decode the data packet through an initialized decoding unit in the second player instance; and a display unit 6033, configured to display a decoded second data stream through an initialized display unit in the second player instance.

In some embodiments, still referring to FIG. 7, the obtaining unit 6031 is configured to: transmit a connection establishment request to the server by using an in-band data channel in response to the played data stream being switched from the first data stream to the second data stream, the in-band data channel being configured for transmitting the second data stream, and the connection establishment request being configured for requesting to establish a data transmission connection to the server; receive, from the in-band data channel, an establishment response returned by the server, the establishment response indicating that the in-band data channel supports data transmission between the terminal and the server; and obtain the data packet of the second data stream from the in-band data channel.

In some embodiments, still referring to FIG. 7, the apparatus further includes:

a transmitting module 604, configured to transmit, at a preset time interval, heartbeat signaling to the server by using the out-of-band signaling channel, the out-of-band signaling channel being configured for transmitting signaling, and the heartbeat signaling being configured for notifying the server of a current status of the terminal; and a receiving module 605, configured to receive a heartbeat response returned by the server, the heartbeat response indicating that a communication connection between the terminal and the server still exists.

When the data stream-based playing apparatus provided in the foregoing embodiment runs an application, division into the foregoing functional modules is only used as an example for description. During actual application, the foregoing functions may be allocated to and completed by different functional modules according to requirements, that is, an internal structure of the apparatus is divided into different functional modules, to complete all or some of the foregoing described functions. In addition, the data stream-based playing apparatus provided in the foregoing embodiments and embodiments of the data stream-based playing method belong to the same concept. For a specific implementation process, reference may be made to the method embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
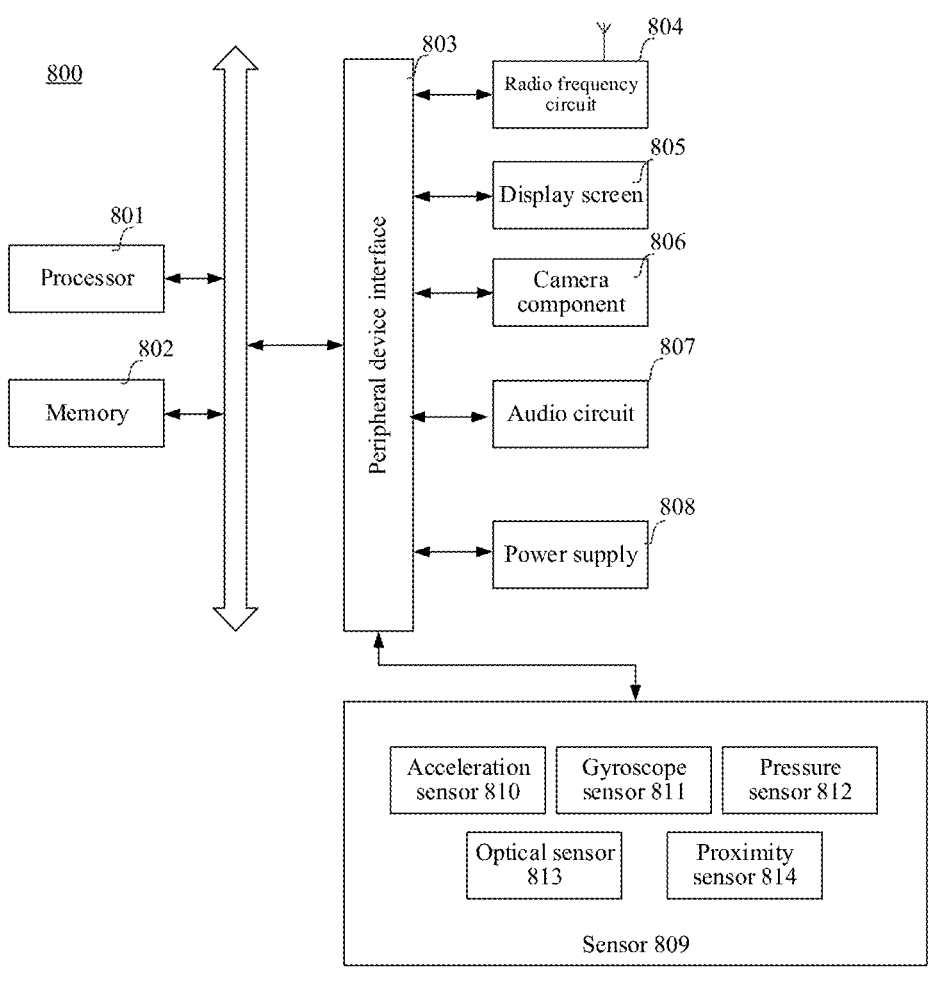
FIG. 8 is a structural block diagram of a terminal according to an embodiment of the present disclosure.

FIG. 8 is a structural block diagram of a terminal 800 according to an embodiment of the present disclosure. The terminal 800 may be a portable mobile terminal, such as: a smartphone, a tablet computer, a Moving Picture Experts Group Audio Layer III (MP3) player, a Moving Picture Experts Group Audio Layer IV (MP4) player, a notebook computer, or a desktop computer. The terminal 800 may also be referred to as user equipment, a portable terminal, a laptop terminal, a desktop terminal, or other names.

Usually, the terminal 800 includes: a processor 801 and a memory 802.

The processor 801 may include one or more processing cores, such as a 4-core processor or an 8-core processor.

In some embodiments, the terminal 800 may further include: a peripheral device interface 803 and at least one peripheral device. The processor 801, the memory 802, and the peripheral device interface 803 may be connected through a bus or a signal cable. Each peripheral device may be connected to the peripheral device interface 803 through a bus, a signal cable, or a circuit board. Specifically, the peripheral device includes: at least one of a radio frequency circuit 804, a display screen 805, a camera component 806, an audio circuit 807, and a power supply 808.

The peripheral device interface 803 may be configured to connect, to the processor 801 and the memory 802, at least one peripheral device related to an input/output (I/O). In some embodiments, the processor 801, the memory 802, and the peripheral device interface 803 are integrated on the same chip or the same circuit board. In some other embodiments, any one or two of the processor 801, the memory 802, and the peripheral device interface 803 may be implemented on a separate chip or circuit board, which is not limited in this embodiment.

The radio frequency circuit 804 is configured to receive and transmit a radio frequency (RF) signal that is also referred to as an electromagnetic signal. The radio frequency circuit 804 communicates with a communication network and another communication device by using the electromagnetic signal.

The display screen 805 is configured to display a user interface (UI). The UI may include a graph, a text, an icon, a video, and any combination thereof.

The camera component 806 is configured to collect an image or a video. In some embodiments, the camera component 806 includes a front-facing camera and a rear-facing camera.

The audio circuit 807 may include a microphone and a speaker.

The power supply 808 is configured to supply power to components in the terminal 800.

In some embodiments, the terminal 800 further includes one or more sensors 809. The one or more sensors 809 include but are not limited to: an acceleration sensor 810, a gyroscope sensor 811, a pressure sensor 812, an optical sensor 813, and a proximity sensor 814.

A person skilled in the art may understand that the structure shown in FIG. 8 does not constitute a limitation to the terminal 800, and the terminal may include more components or fewer components than those shown in the figure, or some components may be combined, or a different component deployment may be used.

Figure 9:
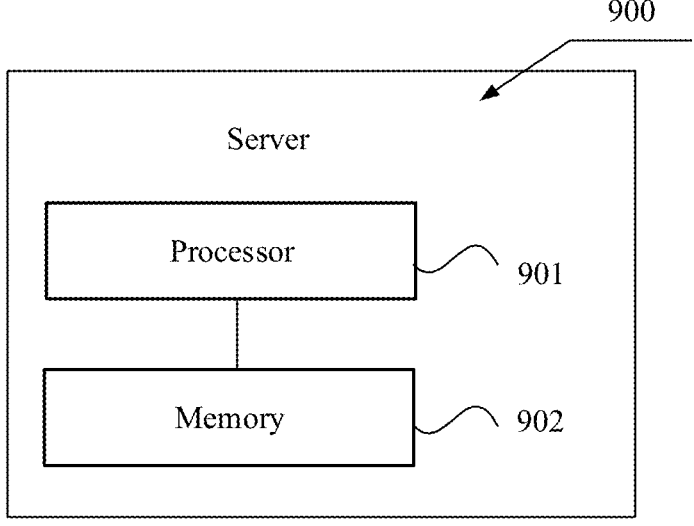
FIG. 9 is a schematic structural diagram of a server according to an embodiment of the present disclosure.

FIG. 9 is a schematic structural diagram of a server according to an embodiment of the present disclosure. The server 900 may vary greatly due to different configurations or performance, and may include one or more central processing units (CPUs) 901 and one or more memories 902. The memory 902 stores at least one computer program, the at least one computer program being loaded and executed by the processor 901 to implement the data stream-based playing method provided in the foregoing method embodiments. Certainly, the server may further include components such as a wired or wireless network interface, a keyboard, and an input/output interface, to facilitate inputs/outputs. The server may further include another component configured to implement functions of a device. Details are not described herein again.

An embodiment of the present disclosure further provides a computer-readable storage medium, having at least one segment of computer program stored herein, the at least one segment of computer program being loaded and executed by a processor of a computer device to implement the operations performed by the computer device in the data stream-based playing method in the foregoing embodiments. For example, the computer-readable storage medium may be a read-only memory (ROM), a random access memory (random access memory, RAM), a compact disc read-only memory (CD-ROM), a magnetic tape, a floppy disk, an optical data storage device, or the like.

An embodiment of the present disclosure further provides a computer program product, including computer program code, the computer program being stored in a computer-readable storage medium. A processor of a computer device reads the computer program from the computer-readable storage medium, and executes the computer program, so that the computer device performs the data stream-based playing method provided in the various example implementations.

A person of ordinary skill in the art may understand that all or some of the operations of the foregoing embodiments may be implemented by hardware, or may be implemented by a program instructing relevant hardware. The program may be stored in the computer-readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A data stream-based playing method, the method being performed by a terminal, and the method comprising:

obtaining a packet header of a second data stream to be played when a first player instance plays a first data stream, the packet header comprising at least one of a coding format or a data format of the second data stream;

initializing a second player instance based on at least one of the coding format or the data format in the packet header, wherein, before a played data stream is switched from the first data stream to the second data stream, the second data stream is preloaded, the preloading of the second data stream comprising the obtaining the packet header and the initializing the second player instance without obtaining a data packet of the second data stream; and playing the second data stream by using the initialized second player instance in response to the played data stream being switched from the first data stream to the second data stream.

2. The method according to claim 1, wherein the obtaining the packet header of the second data stream comprises:

transmitting data acquisition signaling to a server by using an out-of-band signaling channel, the out-of-band signaling channel being configured for transmitting signaling and not for transmitting the first data stream or the second data stream, and the data acquisition signaling being configured for requesting the packet header of the second data stream; and receiving, by using the out-of-band signaling channel, the packet header returned by the server.

3. The method according to claim 2, wherein the receiving, by using the out-of-band signaling channel, the packet header returned by the server comprises:

in response to the server not storing the second data stream, receiving, by using the out-of-band signaling channel, a first data acquisition response returned by the server, the first data acquisition response indicating that the out-of-band signaling channel supports signaling interaction between the terminal and the server; and in response to the server obtaining the packet header of the second data stream, receiving, by using the out-of-band signaling channel, the packet header returned by the server.

4. The method according to claim 3, further comprising:

in response to the server storing the second data stream, receiving, by using the out-of-band signaling channel, a second data acquisition response returned by the server, the second data acquisition response carrying the packet header, and the second data acquisition response indicating that the out-of-band signaling channel supports the signaling interaction between the terminal and the server.

5. The method according to claim 1, wherein the initializing the second player instance based on at least one of the coding format or the data format in the packet header comprises:

setting a parameter of a functional unit in the second player instance based on the coding format and the data format in the packet header, the functional unit being configured to decode and display the second data stream; and allocating, to the second player instance based on the parameter of the functional unit in the second player instance, an internal memory resource required for playing the second data stream.

6. The method according to claim 1, wherein the playing the second data stream by using the initialized second player instance in response to the played data stream being switched from the first data stream to the second data stream comprises:

obtaining the data packet of the second data stream in response to the played data stream being switched from the first data stream to the second data stream;

decoding the data packet through an initialized decoding unit in the second player instance; and displaying a decoded second data stream through an initialized display unit in the second player instance.

7. The method according to claim 6, wherein the obtaining the data packet of the second data stream in response to the played data stream being switched from the first data stream to the second data stream comprises:

transmitting a connection establishment request to a server by using an in-band data channel in response to the played data stream being switched from the first data stream to the second data stream, the in-band data channel being configured for transmitting the second data stream, and the connection establishment request being configured for requesting to establish a data transmission connection to the server;

receiving, from the in-band data channel, an establishment response returned by the server, the establishment response indicating that the in-band data channel supports data transmission between the terminal and the server; and obtaining the data packet of the second data stream from the in-band data channel.

8. The method according to claim 1, wherein the method further comprises:

transmitting, at a preset time interval, heartbeat signaling to a server by using an out-of-band signaling channel, the out-of-band signaling channel being configured for transmitting signaling and not for transmitting the first data stream or the second data stream, and the heartbeat signaling being configured for notifying the server of a current status of the terminal; and receiving a heartbeat response returned by the server, the heartbeat response indicating that a communication connection between the terminal and the server still exists.

9. A computer device, comprising a processor and a memory, the memory being configured to store at least one segment of computer program, the at least one segment of program being loaded and executed by the processor to perform:

obtaining a packet header of a second data stream to be played when a first player instance plays a first data stream, the packet header comprising at least one of a coding format or a data format of the second data stream;

initializing a second player instance based on at least one of the coding format or the data format in the packet header, wherein, before a played data stream is switched from the first data stream to the second data stream, the second data stream is preloaded, the preloading of the second data stream comprising the obtaining the packet header and the initializing the second player instance without obtaining a data packet of the second data stream; and playing the second data stream by using the initialized second player instance in response to the played data stream being switched from the first data stream to the second data stream.

10. The computer device according to claim 9, wherein the obtaining the packet header of the second data stream comprises:

transmitting data acquisition signaling to a server by using an out-of-band signaling channel, the out-of-band signaling channel being configured for transmitting signaling and not for transmitting the first data stream or the second data stream, and the data acquisition signaling being configured for requesting the packet header of the second data stream; and receiving, by using the out-of-band signaling channel, the packet header returned by the server.

11. The computer device according to claim 10, wherein the receiving, by using the out-of-band signaling channel, the packet header returned by the server comprises:

in response to the server not storing the second data stream, receiving, by using the out-of-band signaling channel, a first data acquisition response returned by the server, the first data acquisition response indicating that the out-of-band signaling channel supports signaling interaction between the terminal and the server; and in response to the server obtaining the packet header of the second data stream, receiving, by using the out-of-band signaling channel, the packet header returned by the server.

12. The computer device according to claim 11, wherein the processor is further configured to perform:

in response to the server storing the second data stream, receiving, by using the out-of-band signaling channel, a second data acquisition response returned by the server, the second data acquisition response carrying the packet header, and the second data acquisition response indicating that the out-of-band signaling channel supports the signaling interaction between the terminal and the server.

13. The computer device according to claim 9, wherein the initializing the second player instance based on at least one of the coding format or the data format in the packet header comprises:

setting a parameter of a functional unit in the second player instance based on the coding format and the data format in the packet header, the functional unit being configured to decode and display the second data stream; and allocating, to the second player instance based on the parameter of the functional unit in the second player instance, an internal memory resource required for playing the second data stream.

14. The computer device according to claim 9, wherein the playing the second data stream by using the initialized second player instance in response to the played data stream being switched from the first data stream to the second data stream comprises:

obtaining the data packet of the second data stream in response to the played data stream being switched from the first data stream to the second data stream;

decoding the data packet through an initialized decoding unit in the second player instance; and displaying a decoded second data stream through an initialized display unit in the second player instance.

15. The computer device according to claim 14, wherein the obtaining the data packet of the second data stream in response to the played data stream being switched from the first data stream to the second data stream comprises:

transmitting a connection establishment request to a server by using an in-band data channel in response to the played data stream being switched from the first data stream to the second data stream, the in-band data channel being configured for transmitting the second data stream, and the connection establishment request being configured for requesting to establish a data transmission connection to the server;

receiving, from the in-band data channel, an establishment response returned by the server, the establishment response indicating that the in-band data channel supports data transmission between the terminal and the server; and obtaining the data packet of the second data stream from the in-band data channel.

16. The computer device according to claim 9, wherein the processor is further configured to perform:

transmitting, at a preset time interval, heartbeat signaling to a server by using an out-of-band signaling channel, the out-of-band signaling channel being configured for transmitting signaling and not for transmitting the first data stream or the second data stream, and the heartbeat signaling being configured for notifying the server of a current status of the terminal; and receiving a heartbeat response returned by the server, the heartbeat response indicating that a communication connection between the terminal and the server still exists.

17. A non-transitory computer-readable storage medium, configured to store at least one segment of computer program, the at least one segment of computer program, when being executed by at least one processor of a terminal, causing the at least one processor to perform:

obtaining a packet header of a second data stream to be played when a first player instance plays a first data stream, the packet header comprising at least one of a coding format or a data format of the second data stream;

initializing a second player instance based on at least one of the coding format or the data format in the packet header, wherein, before a played data stream is switched from the first data stream to the second data stream, the second data stream is preloaded, the preloading of the second data stream comprising the obtaining the packet header and the initializing the second player instance without obtaining a data packet of the second data stream; and playing the second data stream by using the initialized second player instance in response to the played data stream being switched from the first data stream to the second data stream.

18. The non-transitory computer-readable storage medium according to claim 17, wherein the obtaining the packet header of the second data stream comprises:

transmitting data acquisition signaling to a server by using an out-of-band signaling channel, the out-of-band signaling channel being configured for transmitting signaling and not for transmitting the first data stream or the second data stream, and the data acquisition signaling being configured for requesting the packet header of the second data stream; and receiving, by using the out-of-band signaling channel, the packet header returned by the server.

19. The non-transitory computer-readable storage medium according to claim 18, wherein the receiving, by using the out-of-band signaling channel, the packet header returned by the server comprises:

in response to the server not storing the second data stream, receiving, by using the out-of-band signaling channel, a first data acquisition response returned by the server, the first data acquisition response indicating that the out-of-band signaling channel supports signaling interaction between the terminal and the server; and in response to the server obtaining the packet header of the second data stream, receiving, by using the out-of-band signaling channel, the packet header returned by the server.

20. The non-transitory computer-readable storage medium according to claim 19, wherein the at least one segment of computer program causes the at least one processor to perform:

in response to the server storing the second data stream, receiving, by using the out-of-band signaling channel, a second data acquisition response returned by the server, the second data acquisition response carrying the packet header, and the second data acquisition response indicating that the out-of-band signaling channel supports the signaling interaction between the terminal and the server.

* * * * *